United States Patent Office 3,787,355
Patented Jan. 22, 1974

3,787,355
STABILIZING OF POLYAMIDES
Helmut Linhart, Reinach, and Helmut Mueller, Binningen, Switzerland, assignors to Ciba-Geigy Corporation, Ardsley, N.Y.
No Drawing. Filed Nov. 30, 1971, Ser. No. 203,467
Claims priority, application Switzerland, Dec. 7, 1970, 18,131/70
Int. Cl. C08g 51/58, 51/60, 51/62
U.S. Cl. 260—45.75 R       16 Claims

ABSTRACT OF THE DISCLOSURE

Disclosed are stabilizing systems comprising (a) a phenolic antioxidant, (b) a derivative of phosphorus and (c) a salt of divalent manganese with inorganic or organic acids.

Polyamide stabilized therewith are less yellowed under thermofixing conditions and they show a good light resistance and excellent long term protection against loss of tensile properties.

---

The present invention relates to the stabilizing of polyamides with a new stabilizer system and to the polyamides stabilized therewith.

It is known to use nuclear alkylated hydroxyphenylpropionic acids as heat stabilizers for polyamides. While such compounds do secure very good protection against the thermo-oxidative degradation of polyamides they are, however, effective only to a very limited degree against light induced degradation, particularly in the case of highly delustred polyamide fibres. It is also known to use manganese compounds, preferably in combination with phosphorus compounds, in order to achieve good light fastness of highly delustred polyamide types. Furthermore, it is known to use combinations of phenolic anti-oxidants with manganese salts and phosphorus compounds in order to obtain polyamides possessing simultaneous heat and light resistance. Such stabilizers do effect a distinct improvement in the light and heat resistance, but they are commercially unsatisfactory in so far as that polyamide fibres stabilized with them still show undesirable yellowing phenomena after the thermofixing.

It has now been surprisingly discovered that a stabilizer system consisting of (a) A compound of the formula

(I)

wherein $R_1$ represents hydrogen or alkyl containing 1 to 5 carbon atoms, $R_2$ represents alkyl containing 1 to 5 carbon atoms, X represents one of the groups

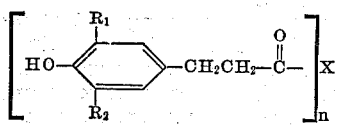

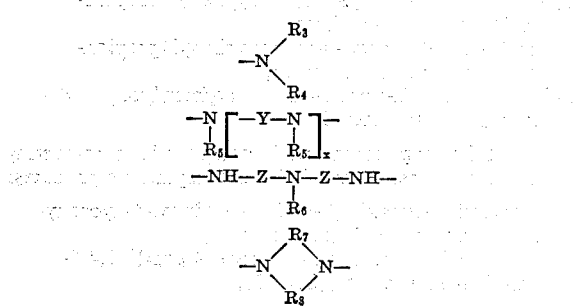

or

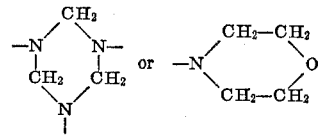

$R_3$ represents hydrogen, alkyl containing 1 to 18 carbon atoms, cycloalkyl containing 6 to 8 carbon atoms or aralkyl containing 7 to 9 carbon atoms, $R_4$ represents alkyl containing 1 to 18 carbon atoms, cycloalkyl containing 6 to 8 carbon atoms or aralkyl containing 7 to 9 carbon atoms, $R_5$ represents hydrogen or alkyl containing 1 to 8 carbon atoms, Y represents alkylene containing 2 to 12 carbon atoms, alkylene containing 2 to 8 carbon atoms interrupted by cyclohexylene or phenylene or represents cyclohexylene, $R_6$ represents alkyl containing 1 to 8 carbon atoms, the group Z—NH— or the direct bond, Z represents alkylene containing 2 to 6 carbon atoms, $R_7$ and $R_8$ represent alkylene containing 1 to 4 carbon atoms and together with both nitrogen atoms form a 6-membered ring, $n=1$ to 3 and $x=1$ to 3, (b) A compound of the Formula II $$(O=)_{n_1}\overset{R_9}{\underset{R_{11}}{P}}-R_{10}$$

(II)

wherein $R_9$, $R_{10}$ and $R_{11}$ are the same or different and independently of one another represent alkyl containing 1 to 18 carbon atoms, cycloalkyl containing 6 to 8 carbon atoms, aralkyl containing 7 to 12 carbon atoms, phenyl, alkylphenyl containing 7 to 10 carbon atoms, hydroxy, alkoxy containing 1 to 18 carbon atoms, cycloalkoxy containing 6 to 8 carbon atoms, aralkoxy containing 7 to 9 carbon atoms, phenoxy or alkylphenoxy containing 7 to 15 carbon atoms and $n_1$ represents 0 or 1, or consists of a mono- or divalent salt of a mono- or polyvalent oxyacid of phosphorus, and (c) A salt of divalent manganese with inorganic or organic acids, prevents the deleterious yellowing of polyamide fibres under thermofixing conditions and simultaneously effects good light resistance and excellent long term protection against loss of tensile properties caused by the action of heat.

Preferably there is used a stabilizer system in which in the compounds of the Formula I, $R_1$ and $R_2$ represent alkyl containing 1 to 4 carbon atoms, $R_3$ represents hydrogen, alkyl containing 1 to 18 carbon atoms, cyclohexyl or benzyl, $R_4$ represents alkyl containing 1 to 8 carbon atoms or cyclohexyl, $R_5$ represents hydrogen or alkyl containing 1 to 4 carbon atoms, Y represents alkylene containing 2 to 12 carbon atoms, 1,4-bis-methylenecyclohexane or 1,4-xylylene, $R_6$ represents the group Z—NH— or the direct bond, Z represents alkylene containing 2 to 3 carbon atoms, $R_7$ and $R_8$ represents ethylene or 1,2-propylene, $n=1$ to 3 and $x=1$ to 3.

Particularly preferred stabilizer systems are those in which in the compounds of the Formula I, $R_1$ and $R_2$ represent t-butyl, X represents one of the groups

—NH—Y—NH—

—NH—Z—N—Z—NH—
        |
        Z
        |
        NH—

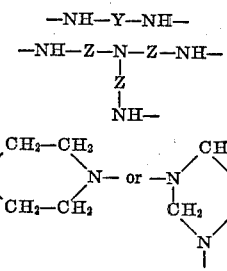

Y represents straight-chain or branched alkylene containing 2 to 12 carbon atoms, preferably 2 to 6 carbon atoms, Z represents alkylene containing 2 to 3 carbon atoms, and n=2 to 3, or in the compounds of the Formula II, $R_9$, $R_{10}$ and $R_{11}$ are the same and independently of one another represent alkyl containing 1 to 8 carbon atoms, benzyl, phenyl, hydroxy, alkoxy containing 1 to 18 carbon atoms, benzyloxy, phenoxy or alkylphenoxy containing 7 to 15 carbon atoms, and $n_1$ is 0 or 1, or in which both in the compounds of the Formula I and in the compounds of the Formula II the symbols have the last mentioned meanings assigned to them, it being also possible to use instead of the compounds of the Formula II a mono- or polyvalent alkali salt of a mono- or polyvalent oxyacid of phosphorus.

Where $R_1$ and $R_2$ in Formula I represent alkyl containing 1–5 carbon atoms, this includes, for example, methyl, isopropyl, sec.-butyl, tert.-butyl, sec.-amyl or tert.-amyl.

Where $R_3$, $R_4$, $R_5$ and $R_6$ in Formula I and $R_9$, $R_{10}$ and $R_{11}$ in Formula II represent alkyl, this includes, for example, in the limits indicated therein, methyl, ethyl, propyl, butyl, pentyl, hexyl, octyl, dodecyl, tetradecyl or octadecyl. Where Y, Z, $R_7$ and $R_8$ in Formula I are alkylene, this includes, for example, in the limits indicated therein, ethylene, propylene, butylene, pentylene, hexylene, octylene, decylene or dodecylene.

$R_3$ and $R_4$ in Formula I and $R_9$, $R_{10}$ and $R_{11}$ in Formula II may be cycloalkyl containing 6 to 8 carbon atoms, for example cyclohexyl or cyclooctyl. If in Formula I, Y represents cyclohexylene or if Y represents alkylene interrupted by cyclohexylene, it may be 1,4-cyclohexylene. If $R_3$ and $R_4$ in Formula I and $R_9$, $R_{10}$ and $R_{11}$ in Formula II are aralkyl, the term may be understood as meaning benzyl, phenylethyl or methylbenzyl. Where Y has the significance of alkylene interrupted by phenylene, this can mean, for example, p-xylylene.

Where $R_9$, $R_{10}$ and $R_{11}$ in Formula II represent alkylphenyl containing 7 to 10 carbon atoms, the alkyl groups may be methyl or butyl.

In Formula II, $R_9$, $R_{10}$ and $R_{11}$ may also represent alkoxy containing 1–18 carbon atoms, for example, methoxy, ethoxy, butoxy, pentoxy, octoxy, iso-octoxy, decyloxy, dodecyloxy, tetradecyloxy or octadecyloxy, cycloalkoxy containing 6 to 8 carbon atoms, such as cyclohexyloxy or cyclooctyloxy, aralkoxy containing 7 to 9 carbon atoms, for example benzyloxy or phenylethyloxy or alkylphenyl containing 7 to 15 carbon atoms, such as methylphenoxy, dimethylphenoxy, t-butylphenoxy, t - octylphenoxy or sec.-nonylphenoxy.

In Formula I, $R_7$ and $R_8$ together with both nitrogen atoms form a heterocycle containing 6 atoms in the ring. The ring in question may be the hexahydropyrimidine ring or the hexahydropyrazine ring which may be substituted by methyl or ethyl groups.

Examples of compounds of the Formula I are:

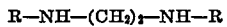

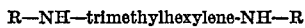

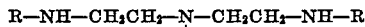

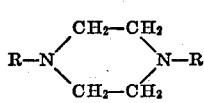

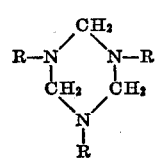

wherein R represents

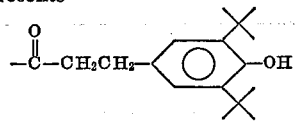

Examples of compounds of the Formula II are: hexylphosphonic acid, benzylphosphonic acid, phenylphosphonic acid, triphenylphosphine, tritolylphosphine, phenyldimethylphosphine, tributylphosphine, triisopropylphosphine, triphenylphosphine oxide, tributylphosphine oxide, tricyclohexylphosphine oxide, dihexylphosphinic acid, triphenylphosphite, tris(nonylphenyl)phosphite, tridecylphosphite, didecylphenylphosphite.

Examples of mono- or polyvalent salts of mono- or polyvalent oxyacids of phosphorus are sodium hexametaphosphate, sodium pyrophosphate and disodium hydrogen phosphate.

Examples of salts of divalent manganese with inorganic and organic acids are: manganese sulphate, chloride, bromide, iodide, oxalate, acetate, benzoate, tartrate, salicylate, lactate, stearate.

Suitable carriers for the new compounds are polyamides and copolyamides which are obtained by polymerization of diamines and dicarboxylic acids and/or of aminocarboxylic acids or the corresponding lactams. The substrates may be in the form of filaments, bristles, films, injection moulded articles and the like.

The compounds of the Formula I are added to the carriers in an amount (relative to the carrier) of 0.01–5% by weight, preferably 0.02–2% by weight. The addition of 0.05–1% by weight of the compounds of the Formula I is particularly preferred.

Relative to the carrier, the compounds of the Formula II are added to the carrier in an amount which corresponds to 1–1000 p.p.m., preferably 10–200 p.p.m. of phosphorus. Amounts of 10–100 p.p.m. are particularly preferred.

The salts of divalent manganese are added to the carriers in an amount which, relative to the carrier, corresponds to 1–500 p.p.m., preferably 10–200 p.p.m. of manganese. Amounts of 10–70 p.p.m. are particularly preferred.

The incorporation of the new stabilizer system into the polyamides can be effected before, during or after the polycondensation, optionally together with further additives, as examples of which there may be cited: pigments, principally titanium dioxide in both its modified forms, rutile and anatase, in concentrations of 0.01–3%; chain regulators, for example acetic acid and benzoic acid and benzoic acid; further additives such as antistatic agents and fire retarding agents.

The manufacture of the compound of the Formula I is described in Belgian Pats. Nos. 624,207 and 726,092; but the manufacture of the compound of the Formula II and the salts of divalent manganese is carried out by methods which are generally known in the art.

The following examples describe the invention.

APPLICATION EXAMPLES

The following chemical terms are given to the stabilizers used in the examples which follow:

1,6-bis[3-(3,5-di-t-butyl-4-hydroxyphenyl)propionamido]-hexane (stabilizer 1),
1,2-bis[3-(3,5-di-t-butyl-4-hydroxyphenyl)propionamido]-ethane (stabilizer 2),
N,N'-bis[3-(3,5-di-t-butyl-4-hydroxyphenylpropionyl]-piperazine (stabilizer 3).

The following commercial compounds representing prior art were tested conjointly as comparative products:

pentaerythritol-tetrakis-[3-(3,5-di-tert.butyl-4-hydroxyphenyl)-propionate] (stabilizer 4),
1,3,5-tris-(3,5-di-tert.-butyl-4-hydroxy-benzyl)-2,4,6-trimethylbenzene (stabilizer 5), 1,1-bis-(2-methyl-4-hydroxy-5-tert.butylphenyl)-butane (stabilizer 6).

EXAMPLE 1

Protection against yellowing of nylon 6.6

The additives described in the following table, including delustring agent (1.8% $TiO_2$ (Anatas) in each case), are added to a 60% aqueous hexamethylene-diamine adipate solution and these mixtures are polycondensed in conventional manner in an autoclave at 275° C. and at max. 18-gauge pressure. The thus stabilized polycondensates are subsequently spun to textile fibres (Td 45/13) and samples of fabric are prepared therefrom. These fabrics are then tested for their tendency to yellowing by means of brightness tests (percent reflection at 440 mm.) before and after a hot air thermofixing (60 secs. at 215° C.). The results are detailed in Table 1 below.

TABLE 1

| Additives | Percent reflection at 440 mm. | |
|---|---|---|
| | Unfixed | Fixed (60 secs. at 215° C.) |
| 25 p.p.m. Mn as Mn-II-acetate plus 0.05% phenylphosphonic acid without stabilizer | 85 | 58 |
| 25 p.p.m. Mn as Mn-II-acetate plus 0.05% phenylphosphonic acid plus 0.2% of stabilizer 1 | 90 | 75 |
| Comparison according to prior art; 25 p.p.m. Mn as Mn-II-acetate plus 0.05% phenylphosphonic acid plus 0.2% of stabilizer 5 | 87 | 65 |

EXAMPLE 2

Long term protection of nylon 6.6 against degradation by heat

The stabilizers listed in the following table are sprinkled dry on polyamide 6.6 granules prepared by the conventional process and in which the light-protective combination 25 p.p.m. Mn as Mn II-acetate, and
0.05% phenylphosphonic acid also the delustring agent, 1.8% $TiO_2$ (Anatas), have already been polycondensed, and the resulting mixtures are spun directly via extruders to titre 130/37. These filaments are subsequently heated for 24, 48, 72, 96 and 120 hours in a forced draught oven at 165° C. and the viscosities in solution are $\eta$ relatively determined after the various oven ageing times. The results are given in Table 2.

TABLE 2
($\eta$ rel./1% in $H_2SO_4$)

| Stabilizers | Untreated | After oven aging at 165° C during, hours | | | | |
|---|---|---|---|---|---|---|
| | | 24 | 48 | 72 | 96 | 120 |
| Without stabilizer | 2.20 | 1.40 | 1.38 | | | |
| 0.5% stabilizer 1 | 2.20 | 1.95 | 1.88 | 1.75 | 1.62 | 1.54 |
| Comparison according to prior art; 0.5% stabilizer 5 | 2.19 | 1.85 | 1.70 | 1.55 | | |

EXAMPLE 3

Long term protection of nylon 6 against degradation by heat

The stabilizers listed in the following table are sprinkled dry on polyamide 6 granules prepared by the conventional process in an autoclave and in which the light-protective combination 50 p.p.m. Mn as Mn-II-acetate
0.025% sodium hexametaphosphate and the delustring agent 1.87% $TiO_2$ (Anatas), have already been polymerized, and the resulting mixtures are spun directly via extruders to 20 den. monofilaments. These filaments are subsequently tempered in a forced draught oven for 24, 48, 72, 96 and 120 hours at 165° C. and the viscosities in solution are $\eta$ relatively determined after the various oven ageing times. The results are given in Table 3.

TABLE 3
($\eta$ rel./1% in $H_2SO_4$)

| Stabilizers | Untreated | After oven aging at 165° C. during, hours | | | | |
|---|---|---|---|---|---|---|
| | | 24 | 48 | 72 | 96 | 120 |
| Without stabilizer | 2.40 | 1.45 | 1.39 | | | |
| 0.5% stabilizer 1 | 2.40 | 2.33 | 2.10 | 2.0 | 1.80 | 1.58 |
| Comparison according to prior art; 0.5% stabilizer 5 | 2.40 | 1.92 | 1.60 | 1.45 | | |

The residual strengths were determined in percent likewise after various oven ageing times. The results are given in Table 4.

TABLE 4.—PERCENT RESIDUAL STRENGTH

| Stabilizers | After oven aging at 165° C. during, hours | | | | |
|---|---|---|---|---|---|
| | 24 | 48 | 72 | 96 | 120 |
| Without stabilizer, percent | 38 | | | | |
| 0.5% stabilizer 1, percent | 95.5 | 90 | 90 | 71 | 59 |
| Comparison according to prior art, 0.5% stabilizer 5, percent | 69 | 58 | 23 | | |

EXAMPLE 4

Long term protection of slightly delustred nylon 6 against degradation by heat The stabilizers listed in the following table are sprinkled dry on polyamide 6 granules prepared by the conventional process in an autoclave and in which the light protective combination 50 p.p.m. Mn as Mn-II-acetate
0.025% sodium hexametaphosphate and the delustring agent, 0.1% $TiO_2$ (Anatas), have already been polymerized, and spun to 20 den, monofilaments. The filaments are subsequently tempered in a forced draught oven for 24, 48, 72, 96 and 120 hours at 165° C. and the residual strengths are determined in percent after the various oven ageing times. The results are given in Table 5.

TABLE 5

| Stabilizers | Untreated | After oven aging at 165° C. during, hours | | | | |
|---|---|---|---|---|---|---|
| | | 24 | 48 | 72 | 96 | 120 |
| Without stabilizer, percent | 100 | 20 | 12 | | | |
| 0.5% stabilizer 1, percent | 100 | 87 | 74 | 66 | 60 | 59 |
| 0.5% stabilizer 2, percent | 100 | 84 | 68 | 48 | 38 | 30 |
| 0.5% stabilizer 3, percent | 100 | 82 | 66 | 36 | 26 | 20 |
| Comparison according to prior art: | | | | | | |
| 0.5% stabilizer 4, percent | 100 | 40 | 26 | | | |
| 0.5% stabilizer 6, percent | 100 | 55 | 27 | | | |

EXAMPLE 5

Improvement of the light protection of nylon 6

The stabilizers listed in the following table are sprinkled dry on polyamide granules prepared by the conventional process in an autoclave and in which the light protective combination 50 p.p.m. Mn as Mn-II-acetate
0.025% sodium hexametaphosphate and the delustring agent, 0.1% $TiO_2$ (Anatas), have already been polymerized, and spun to 20 den. monofilaments. These filaments are subsequently exposed stress-free on a white cardboard background in a xenotest device (type 45, rotating movement) and the residual strengths were determined after 1000, 1500 and 2000 hours exposure time. The results are given in Table 6.

TABLE 6.—PERCENT RESIDUAL STRENGTHS

| Stabilizers | Exposure time in xenotest, hours | | |
|---|---|---|---|
| | 1,000 | 1,500 | 2,000 |
| Without stabilizer, percent | 85 | 65 | 40 |
| 0.2% stabilizer 1, percent | 90 | 80 | 60 |
| Comparison according to prior art, 0.2% stabilizer 5, percent | 84 | 67 | 43 |

EXAMPLE 6

Improvement in the light protection of nylon 6

The stabilizers listed in the following table are sprinkled dry on polyamide granules prepared by the conventional process in an autoclave and in which the light protective combination 50 p.p.m. Mn as Mn-II-acetate
0.025% sodium hexametaphosphate and the delustring agent, 0.1% $TiO_2$ (Anatas), have already been polymerized, and spun to 20 den. monofilaments. These filaments are subsequently exposed stress-free on a white cardboard background in a xenotest device (type 45, rotating movement) and the residual strengths were determined after 1000, 1500 and 2000 hours exposure time. The results are given in Table 7.

TABLE 7.—PERCENT RESIDUAL STRENGTH

| Stabilizers | Exposure time in xenotest, hours | | |
|---|---|---|---|
| | 1,000 | 1,500 | 2,000 |
| Without stabilizer, percent | 85 | 65 | 40 |
| 0.2% stabilizer 1, percent | 92 | 85 | 64 |
| Comparison according to prior art, 0.2% stabilizer 5, percent | 85 | 70 | 45 |

What we claim is:

1. A stabilizer system consisting essentially of
(a) from 0.01 to about 5% by weight of the substrate of a compound of Formula I

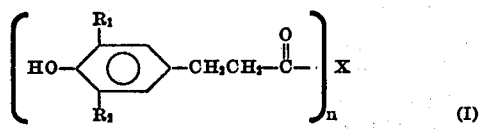

(I)

wherein
$R_1$ represents hydrogen or alkyl containing 1 to 5 carbon atoms,
$R_2$ represents alkyl containing 1 to 5 carbon atoms,
X represents one of the groups $$-N\binom{-Y-N}{R_5}_x-$$

$$-N-Z-N-Z-NH-$$
$$\quad\quad |$$
$$\quad\quad R_7$$

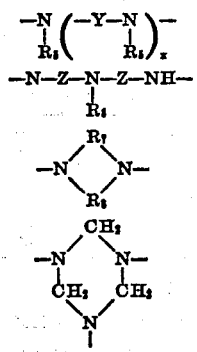

$R_5$ represents hydrogen or alkyl containing 1 to 8 carbon atoms,
Y represents alkylene containing 2 to 12 carbon atoms, alkylene containing 2 to 8 carbon atoms interrupted by cyclohexylene or phenylene or represents cyclohexylene,
$R_6$ represents alkyl containing 1 to 8 carbon atoms, the group —Z—NH or the direct bond, Z represents alkylene containing 2 to 6 carbon atoms,
$R_7$ and $R_8$ represents alkylene containing 1 to 4 carbon atoms and together with both nitrogen atoms form a 6-membered ring,
$n$ equals 2 or 3, and
$x$ equals 1 to 3;
(b) from 1 to about 1,000 p.p.m. of phosphorus based on the weight of substrate wherein said phosphorus is in the form of a compound of Formula II

(II)

wherein
$R_9$, $R_{10}$ and $R_{11}$ are the same or different and independently of one another represent alkyl containing 1 to 18 carbon atoms, cycloalkyl containing 6 to 8 carbon atoms, aralkyl containing 7 to 12 carbon atoms, phenyl, alkylphenyl containing 7 to 10 carbon atoms, hydroxy or an alkali metal salt of an oxyacid of phosphorus; and
(c) from 1 to 500 p.p.m. of manganese based on the weight of the substrate, said manganese being in the form of a salt of divalent manganese of inorganic or organic acids.

2. A stabilizer system according to claim 1, wherein in Formula I, $R_1$ and $R_2$ represent alkyl containing 1 to 4 carbon atoms, $R_5$ represents hydrogen or alkyl containing 1 to 4 carbon atoms, Y represents alkylene containing 2 to 12 carbon atoms, 1,4-bis-methylenecyclohexane or 1,4-xylylene, $R_6$ represents the group-Z-NH- or the direct bond, Z represents alkylene containing 2 to 3 carbon atoms, $R_7$ and $R_8$ represents ethylene or 1,2-propylene, $n=2$ or 3, and $x=1$ to 3.

3. A stabilizer system according to claim 1, wherein in Formula I, $R_1$ and $R_2$ represent t-butyl, X represents one of the groups $$-NH-Y-NH-$$
$$-NH-Z-N-Z-NH-$$
$$\quad\quad\quad |$$
$$\quad\quad\quad Z$$
$$\quad\quad\quad |$$
$$\quad\quad\quad NH-$$

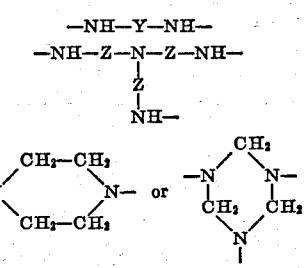

Y represents straight-chain or branched alkylene containing 2 to 12 carbon atoms, Z represents alkylene containing 2 to 3 carbon atoms, and $n=2$ to 3.

4. A stabilizer system according to claim 1, wherein in the Formula II, $R_9$, $R_{10}$ and $R_{11}$ are the same or different and independently of one another represent alkyl containing 1 to 8 carbon atoms, benzyl, phenyl, hydroxy.

5. A stabilizer system according to claim 1, which consists of
(a) a compound of the Formula I, wherein $R_1$ and $R_2$ represent t-butyl, X represents a groups of the formulae

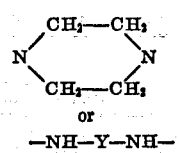

or $$-NH-Y-NH-$$

wherein Y represents alkylene containing 2 to 6 carbon atoms and $n$ is 2,
(b) a compound of the Formula II, wherein $R_9$, $R_{10}$ and $R_{11}$ represent phenyl and/or hydroxyl, or the sodium salt of hexametaphosphoric acid and
(c) Mn(II) acetate.

6. A stabilizer system according to claim 1 wherein component (b) is an alkali metal salt of an oxyacid of phosphorus.

7. A stabilizer system according to claim 1, consisting of 1,6 - bis[3 - (3,5 - di - tert.butyl - 4-hydroxyphenyl)-propionamido] - hexane, phenylphosphonic acid and Mn(II)acetate.

8. A stabilizer system according to claim 1, consisting of 1,6 - bis[3 - (3,5 - di - tert.butyl-4-hydroxyphenyl)-propionamido]-hexane, sodium hexametaphosphate and Mn(II)acetate 9. A stabilizer system according to claim 1, consisting of 1,6 - bis[3 - (3,5 - di - tert.butyl-4-hydroxyphenyl)- porpionamido]-ethane, sodium hexametaphosphate and Mn(II)acetate.

10. A stabilizer system according to claim 1, consisting of N,N' - bis - [3-(3,5-di-tert.butyl hydroxyphenyl)-propionyl]-piperazine, sodiumhexametaphosphate and Mn(II)acetate.

11. A composition containing a polyamide having recurring amide groups as integral parts of the main polymer chain stabilized with a stabilizer system of claim 1.

12. A composition according to claim 11, which contains a stabilizer system of claim 2.

13. A composition of matter according to claim 11, which contains a stabilizer system of claim 3.

14. A composition of matter according to claim 11, which contains a stabilizer system of claim 4.

15. A composition of matter according to claim 11, which contains a stabilizer system of claim 5.

16. A composition of matter according to claim 11, which contains a stabilizer system of claim 6.

References Cited

UNITED STATES PATENTS

| | | | |
|---|---|---|---|
| 3,274,151 | 9/1966 | Settele | 260—45.75 |
| 3,282,939 | 11/1966 | Spivack et al. | 260—247.7 |
| 3,352,821 | 11/1967 | Costain et al. | 260—45.75 |
| 3,533,986 | 10/1970 | Davy | 260—37 |
| 3,584,047 | 6/1971 | Dexter et al. | 260—559 |
| 3,359,346 | 7/1971 | Hermann et al. | 260—45.75 |
| 3,595,936 | 7/1971 | Birenzvige et al. | 260—85.7 |
| 3,624,245 | 11/1971 | Crovatt, Jr. | 260—18 |
| 3,639,336 | 2/1972 | Beears | 260—45.8 |
| 3,679,624 | 7/1972 | Edgar et al. | 260—37 |

DONALD E. CZAJA, Primary Examiner

R. A. WHITE, Assistant Examiner

U.S. Cl. X.R.

252—400, 403; 260—18 N, 45.7 P, 45.8 N, 45.9 R